United States Patent Office 3,063,843
Patented Nov. 13, 1962

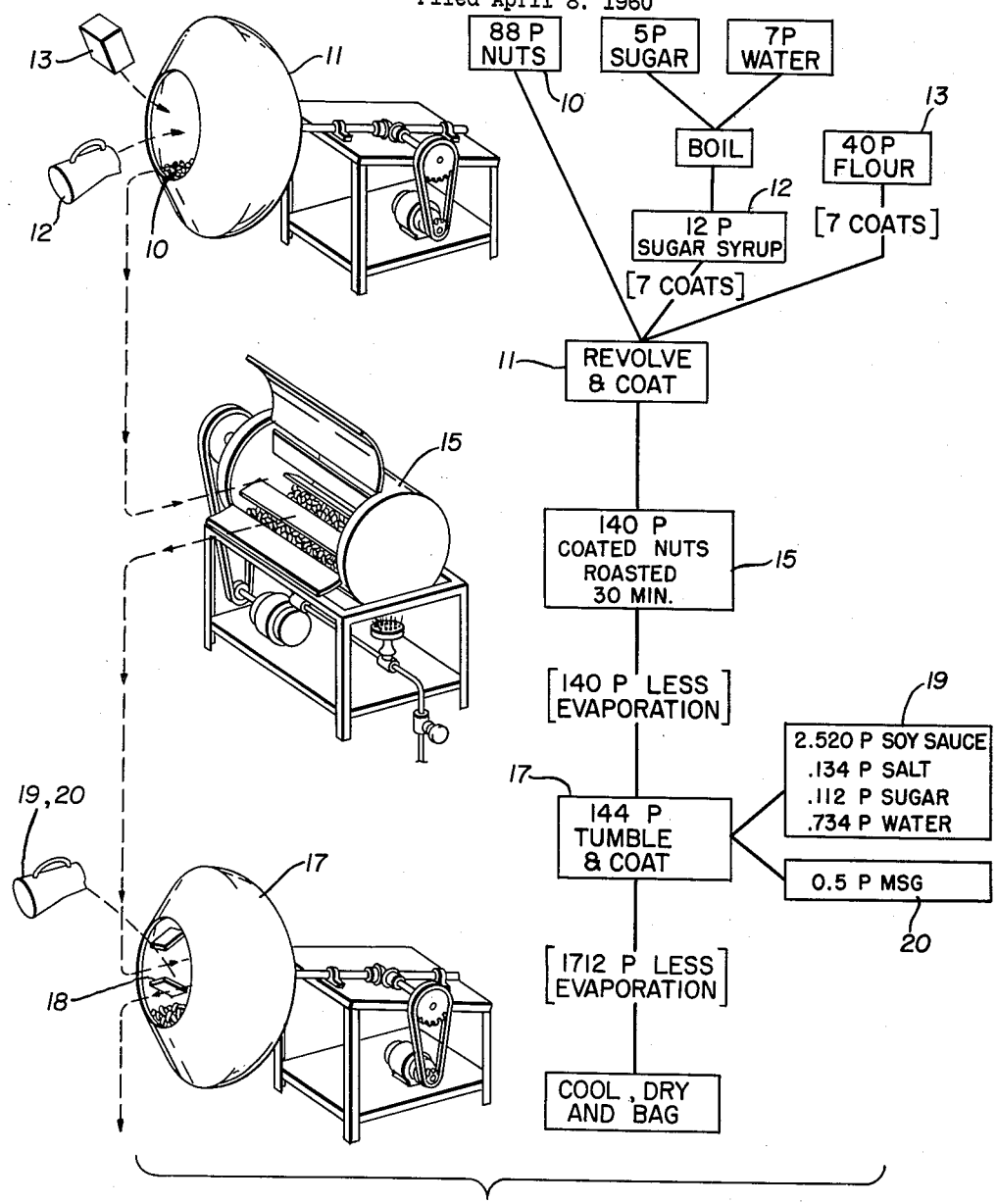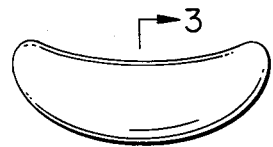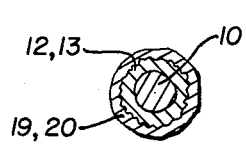
FIG. 1
FIG. 2
FIG. 3

3,063,843
CONFECTION AND METHOD OF MAKING
Tenzo Nishikawa Hashimoto, Mexico City, Mexico, assignor to Kakawateez, Ltd., Findlay, Ohio, a partnership of Ohio
Filed Apr. 8, 1960, Ser. No. 21,001
2 Claims. (Cl. 99—126)

The present invention relates to food products and has significance in connection with methods of preparing confections to take the place of popcorn, and other tid-bits as currently served in lounge bars, for example.

It is an object of the present invention to provide a novel confection and one which has, for many people, a greater appeal than snacks heretofore known.

Another object of the invention is to provide a novel method of treating nut-meats.

In accordance with one aspect of the invention I obtain shelled raw peanuts and put the nut meats in a rotatable drum. A sugar syrup is made up and periodically added with interspersed wheat flour additions during continuous rotation of the drum to provide as many as seven sugar-syrup-held flour coatings on the peanuts. Then the coated nuts are roasted for about thirty minutes. Next they are revolved in combination with an addition of soy sauce, salt, sugar, water, and MSG, although various substitutions or omissions might be made. Thereafter the coated nuts are spread out and dried.

Various objects and advantages may become apparent, and the invention may be better understood from consideration of the following description take in connection with the accompanying drawing, in which:

FIG. 1 is a diagrammatic representation of machinery and process steps useful in practicing the process and making the article of the invention;

FIG. 2 is an elevation view of a piece finished in accordance with the invention; and FIG. 3 is a cross-section along the line 3—3 of FIG. 2.

While other apparatus could be used, for example to perform the entire process in a single machine, in FIG. 1 I have shown diagrammatic representations of plural machines which might be successively used, together with a one-line diagram to show preferred process steps.

In the following description, all "parts" are "by weight," and the specific gravity of the few liquids involved may be taken as 1 so that a pint equals a pound, a kilogram equals a liter, etc. The proportions can be varied as much as 5%, or more.

Excellent results have been obtained by starting with medium size Virginia peanuts. They are first shelled, and they may be sorted by size if desired, and then placed in a revolving drum 11 and then sugar syrup 12 is added a little at a time along with interspersed additions of wheat flour 13.

The sugar syrup may be made in more or less conventional manner of five parts sugar and seven parts water, mixed and then brought to a boil to provide sugar syrup 12. This syrup 12 with the flour 13 is added to the shelled nuts 10 in the coating machine in such manner that multi-coats, for example, seven different coats each of sugar syrup and flour, are placed upon the individual nut meats. Thereafter the multi-coated nuts are well roasted as in a gas fired rotatable drum oven 15, and if separate apparatus is used, as shown in the drawing, the toasted nuts are then removed from the oven and placed in an additional machine having a rotatable drum 17 and baffles 18 and where they receive a finish coating for which I prefer to use a sauce 19 comprising soy sauce, salt, sugar, and water all stirred together and then with the addition of MSG (monosodium glutamate) such as that sold under the name "Accent" by many companies. Another spice might be used instead of the soy sauce, and another flavor stimulating agent 20 might be used instead of MSG.

Good results can be obtained using proportions of the various ingredients as follows:

|  | Actual, lb. | Percent of Mix | Fig. 1, Parts |
|---|---|---|---|
| Peanuts | 22 | 61 | 88 |
| Flour | 10 | 27.8 | 40 |
| Sugar Syrup [1] | 3 | 8.4 | 12 |
| Sauce [2] | 0.88 | 2.46 | 3.5 |
| MSG | 0.12 | .34 | .5 |
| Total | 36 | 100 | 144 |

[1] Sugar Syrup:

|  | Actual, lb. | Percent of Mix | Fig. 1, Parts |
|---|---|---|---|
| Sugar | 5 | 42 | 5 |
| Water | 7 | 58 | 7 |
| Sub-Total | 12 | 100 | 12 |

[2] Sauce:

|  | Actual, lb. | Percent of Mix | Fig. 1, Parts |
|---|---|---|---|
| Soy Sauce | 18 | 72 | 2.520 |
| Salt | 1 | 4 | .134 |
| Sugar | 0.8 | 3 | .112 |
| Water | 5.2 | 21 | .734 |
| Sub-Total | 25 | 100 | 3.500 |

The sugar in each case is preferably granulated (white) although this is not essential, and I prefer in the first coating steps (as in drum 13) to first coat the nutmeats with the syrup (to cause adherence) and later add the flour. The roasting is done preferably for a period as long as thirty minutes. I do not have a thermometer available but it is believed that the roasting temperature is about 525° F. The final drum 17 may be advantageously provided with an interior of porcelain enamel in order to handle the coated nuts while they are hot.

As previously stated, FIG. 2 is an elevation view of a nutmeat and FIG. 3 is a cross-section thereof showing the various coatings. While the first seven coatings, which may be thought of as 12—13, do not usually penetrate into the nut to any great extent, the final coating 19 will penetrate into the prior coatings 12—13 to such an extent that the eater cannot distinguish between coatings even though there may be observable difference when the final product is broken or scratched.

Since the ordinary producer of a confection is not apt to be a chemist, it may be added that the invention is operative if twenty-two pounds of shell peanuts are placed in a revolving machine, ten pounds of flour, and one and one-half quarts of sugar syrup are alternately added to the nut meats as they revolve, and when they are thus coated sufficiently they are revolved while roasted for thirty minutes or until done, and then they are revolved while approximately a pint of mixed sauce and MSG is applied for a final coating.

While I have illustrated and described a particular embodiment, various modifications may obviously be made without departing from the true spirit and scope of the invention which is intended to be defined by the appended claims taken with all reasonable equivalents.

I claim:
1. Method of making a confection which comprises completely covering a nutmeat base with a coating of sugar syrup, additionally completely covering with a coating of flour, thereafter roasting base and aforesaid coatings, and then completely covering with a coating of a sauce containing a spice, while depending upon the latent heat of base and prior coatings to solidify said last mentioned coating.

2. A confection made according to the method of claim 1.

References Cited in the file of this patent

UNITED STATES PATENTS

| | | |
|---|---|---|
| 2,278,467 | Musher | Apr. 7, 1942 |
| 2,404,177 | Jetschmann | July 16, 1946 |